United States Patent [19]

Euzen et al.

[11] 4,392,943

[45] Jul. 12, 1983

[54] PROCESS AND DEVICE FOR WITHDRAWING SOLID PARTICLES AND INTRODUCING A LIQUID CHARGE AT THE LOWER PORTION OF A CONTACT ZONE

[75] Inventors: Jean-Paul Euzen, Ecully; Yves Jacquin, Sevres, both of France; Hugo Van Landeghem, deceased, late of Oytier Saint Oblas, France, by Renate Van Landeghem-Heynderickx, executor

[73] Assignee: Institut Francais du Petrole, Rueil-Malmaison, France

[21] Appl. No.: 373,183

[22] Filed: Apr. 29, 1982

[30] Foreign Application Priority Data

Apr. 29, 1981 [FR] France .................................. 81 08761

[51] Int. Cl.³ ........................ C10B 31/02; C10B 31/12
[52] U.S. Cl. ..................................... 208/152; 208/166; 208/171; 422/143; 422/311; 34/57 A
[58] Field of Search ............... 208/152, 166, 171, 165, 208/166; 422/219, 143, 311; 201/31; 34/57 A

[56] References Cited

U.S. PATENT DOCUMENTS

| 2,490,828 | 12/1949 | Newton | 208/171 |
| 2,897,138 | 7/1959 | Ardern | 208/171 |
| 3,370,361 | 2/1968 | Guerrieri | 34/57 A |
| 3,679,563 | 7/1972 | Pollock | 208/166 |

FOREIGN PATENT DOCUMENTS 589879 7/1947 United Kingdom ................. 208/165

Primary Examiner—Delbert E. Gantz
Assistant Examiner—Lance Johnson
Attorney, Agent, or Firm—Millen & White

[57] ABSTRACT

In a process for the catalytic treatment of hydrocarbon charges in the presence of hydrogen in a vertical reactor where the catalyst is introduced at the top and withdrawn at the bottom, countercurrently with the charge which is introduced at the bottom and discharged from the top. There is provided a flared funnel for the catalyst discharge having small perforations for the upward flow of the charge with the perforations of a size sufficiently small to prevent passage of the catalyst therethrough. These perforations are in association with injection tubes having orifices opening in the vicinity of the funnel wall, wherethrough at least a portion of the fluid charge is injected.

16 Claims, 13 Drawing Figures

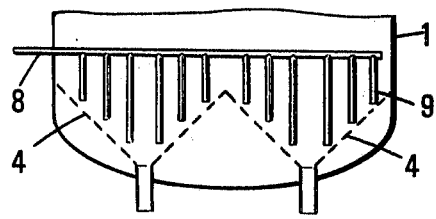
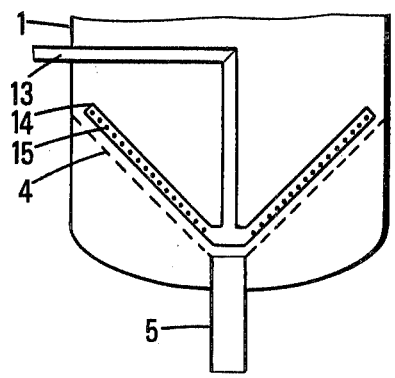
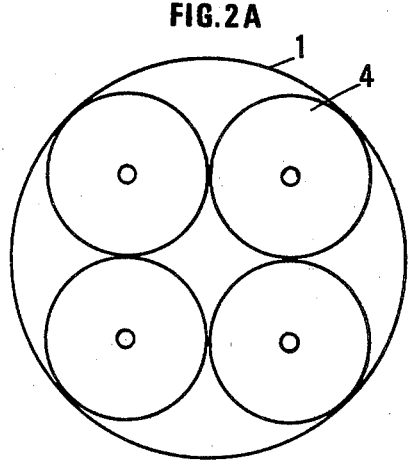
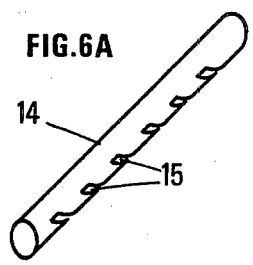
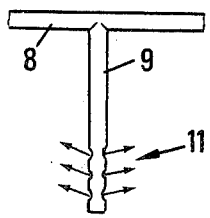
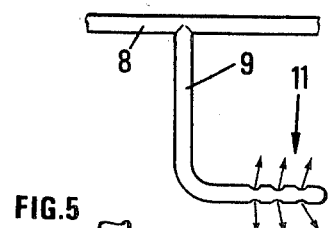
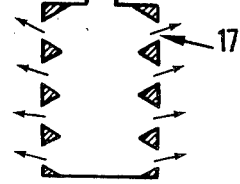
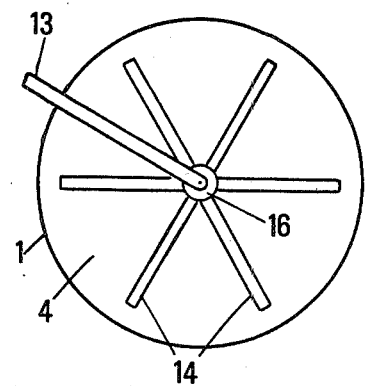

PROCESS AND DEVICE FOR WITHDRAWING SOLID PARTICLES AND INTRODUCING A LIQUID CHARGE AT THE LOWER PORTION OF A CONTACT ZONE

BACKGROUND OF THE INVENTION

The present invention concerns a process and devices for the catalytic treatment of a fluid charge, and more particularly, for hydrocarbon conversion or hydroconversion.

The invention is particularly applicable to the catalytic treatment of liquid charges such, as for example, heavy crude oils, vacuum residues of hydrocarbons distillation, these treatments being generally effected in the presence of hydrogen and/or gaseous mixtures of high hydrogen content, over a bed of a solid catalyst, the catalyst being used as particles (extrudates, particles of various shapes, balls etc.).

In such catalytic treatments, a quick deactivation of the catalyst is often observed as the effect of catalyst poisons, coke formation, fouling by certain metals, etc.

This deactivation requires the frequent replacement of a portion or the entire catalyst bed.

According to the invention, the catalyst withdrawal from the reactor is effected progressively. The term "progressively" means that the catalyst may be withdrawn:

either periodically, for example, at a frequency from 1/10 to 10 days, while withdrawing at each time only a fraction, for example from 0.5 to 15%, of the total catalyst amount. It is possible, according to the needs, to withdraw a greater catalyst amount, for example up to 100% of the total catalyst amount, i.e. the totality of the catalyst. The catalyst withdrawal frequency may be higher (periodicity of the order of 1 minute or 1 second for example), the withdrawn amount being accordingly reduced. Between two withdrawal periods, the reactor thus operates with a fixed bed.

Or in a continuous manner; in this case, the reactor is of the movable bed type. The fresh catalyst is introduced at the upper portion of the reactor and the process and the devices for removing the used catalyst at the lower portion of the reactor through a withdrawal funnel, are the object of the present invention.

The process according to the invention and the devices of the invention are also convenient for withdrawing catalyst particles from reactors for the cracking, hydrocracking, hydroreforming, aromatic hydrocarbon manufacture, paraffinic, naphthenic or aromatic hydrocarbon isomerization, the various reactions of hydrogenation, dehydrogenation, alkylation, transalkylation hydrodecyclization, hydrodealkylation, etc. reactors wherein the injected charge and/or gases flow upwardly. The device and the process according to the invention are also convenient for all the vessels where are handled liquids and/or gases as well as solid, powdered particles, irrespective of their size, provided that they may flow downwardly by gravity effect or by means of a controlled gas leak driving these particles. Non limitative examples of said particles are: gravels, sands, balls, grains, granules, tablets, pellets of any kind used in pharmacy, confectionary, food industry, etc.

Preferably, the fluid charge is introduced into the particles containing reactor or enclosure through distribution means located at the lower part of the reactor or enclosure and circulates countercurrently with the catalyst or the particles before being discharged, after treatment, from the upper part of the reactor (or the enclosure which will be arbitrarily called "reactor" in the description hereinafter).

The flow of the catalyst or particles, by gravity, ensures the regular lowering of the catalyst bed or of the particles bed (particles which will be called arbitrarily "catalyst" in the description hereinafter), whereas the upward circulation of the fluid charge makes possible, in particular, to easily adjust the residence time and to provide a continuous fluid phase.

Furthermore, the countercurrent circulation of the charge and the catalyst makes it possible to obtain a more complete catalytic conversion since the fresh catalyst introduced at the top of the reactor treats an almost already converted charge (i.e. essentially containing compounds whose conversion is difficult), whereas, at the reactor bottom, the used catalyst treats a fresh charge (i.e. a charge having a high content of compounds easy to convert), thereby efficiently effecting the first steps of the conversion. This results in a systematic use of the catalyst in the reactor, a more regular thermal gradient of the catalyst bed than with a circulation of the co-current type, with, in particular, at the bottom of the reactor, a more moderate temperature reducing the probability of catalyst coking.

A catalytic conversion process with a movable bed is taught in U.S. Pat. No. 3,826,737. This process is, however, more particularly adapted to the co-current circulation of the catalyst and of the liquid charge, the latter being discharged at the reactor bottom through a cylindrical grid placed at the bottom of the catalyst discharge cone.

This process has the disadvantage resulting from the possibility of clogging of the grid by the catalyst particles pushed against the grid by the liquid charge discharged from the bottom of the reactor. There may result therefrom an uneven distribution of the fluid through the catalyst, a difficult flow of the catalyst bed, with the possibility of blocking certain zones of the bed, as well as an increase of catalyst abrasion due to the friction between blocked particles and the free particles of the catalyst bed, and between free catalyst particles and the grid for the discharge of the liquid charge.

SUMMARY OF THE INVENTION

The object of the invention is to provide a technique which avoids the above mentioned disadvantages.

This result is achieved by a process for withdrawing powdered solid particles from a generally confined space and to introduce into said space a fluid charge consisting of at least one liquid, said generally confined space having substantially the shape of an elongate and substantially vertical volume of revolution, with the solid particles being introduced at the upper part of the enclosure and withdrawn progressively from the lower part of the enclosure after their downward flow through said enclosure, and the liquid charge is introduced at least partly in the lower part of said enclosure and is withdrawn from the upper part after its upward flow through said enclosure. The process is characterized by the solid particles being withdrawn from the lower end of a flared zone having the shape of an inverted cone, or of an inverted pyramid, i.e. of a cone or a pyramid whose top is overturned, the top having an opening of sufficient size for discharging the solid particles, the walls of said flared zone being substantially and regularly discontinuous, i.e., being dotted with at least several regularly spaced openings, each having a sufficiently small size to prevent the solid particles from passing through said walls but large enough to give optional passage to an upward stream of at least a portion of the fluid charge. The process is further characterized in that at least a portion of the fluid charge is injected in the lower portion of said enclosure through at least two orifices located either above said walls or below said walls, or one or several orifices above said walls with the other orifice or orifices below said walls. Each orifice is at a distance from said walls equal, for example, to at least the average size of a solid particle and to at most about 500 times the average size of a solid particle, said distance being preferably from 4 to 50 times the average size of a solid particle of catalyst and generally lower than 10 cm, for example, on the order of 5 cm.

BRIEF DESCRIPTION OF DRAWINGS

The invention is illustrated by various figures of the accompanying drawings wherein:

FIGS. 2 and 2A show another embodiment, in axial cut and in cross-section respectively, of the device with several catalysts withdrawal funnels.

FIGS. 3 to 6, 6A and 6B illustrate various embodiments of the fluid charge feeding means.

DETAILED DISCUSSION OF THE INVENTION

Figure 1:
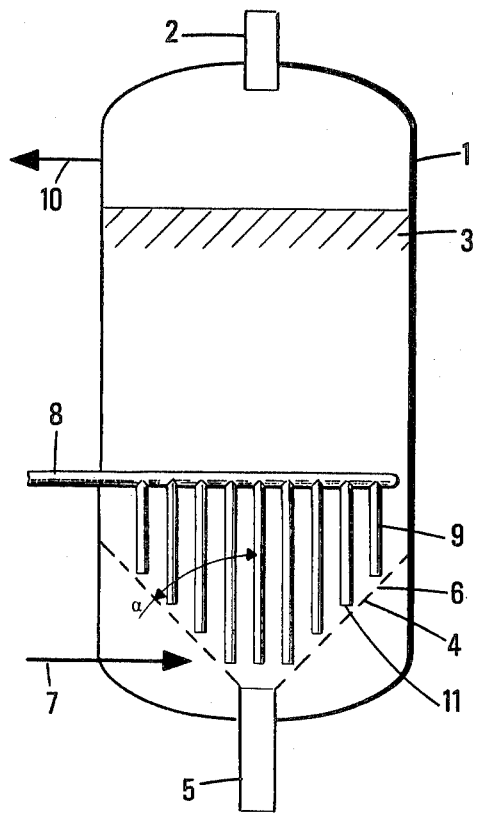
FIGS. 1, and 1B show, in axial cut, and 1A, in cross-section, a device according to the invention, with a single catalyst withdrawal funnel.
Figure 1B:
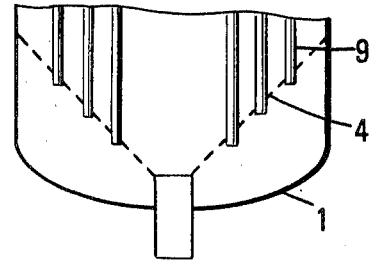
Figure 1C:
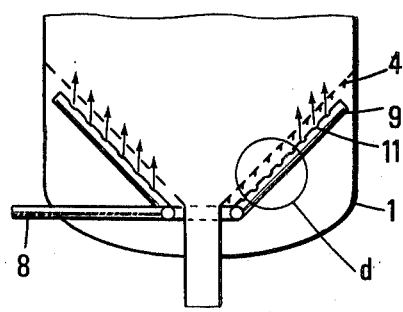
FIGS. 1C and 1D show respectively axial cross-section and enlarged axial cross-section views of the charge introducing means under the grid 4 of FIG. 1B.
Figure 1A:
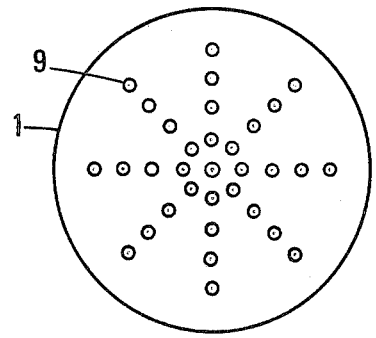

FIGS. 1, 1A and 1B diagrammatically show a first embodiment of a catalytic treatment device, for example with a movable bed.

The reactor 1 which may be of the radial or axial type, comprises, at its upper part, means for introducing fresh catalyst (new or regenerated) diagrammatically shown as duct 2 which delivers the catalyst particles for feeding a catalyst bed 3.

The catalyst flows by gravity through the reactor and is discharged from duct 5, at the lower part of the reactor 1, through a withdrawal funnel 4 which, on the figure, is shown as a grid. This funnel has, in this case, the shape of an inverted cone, and is provided with openings such as 6, formed of perforations of the grid 4, giving passage to at least a portion of liquid and/or gaseous charge optionally injected below the level of the grids through a duct such as 7, but which retains the catalyst particles.

The angle $\alpha$ between the cone axis (or the pyramid axis when the funnel has this shape) with one of the cone generatrices (or cone of the solid angles of the pyramid) is from 10° to 80°, preferably from 30° to 40°. At least a portion of the liquid charge is introduced at the lower part of the reactor 1 through means comprising at least one spray bar 8 feeding a plurality of vertical injection tubes 9.

This fluid charge, which may be formed of one or two phases (liquid or/and gas), flows upwardly through the reactor in counter-current with the catalyst before being discharged at the upper part of the reactor through gathering and discharge means diagrammatically shown as duct 10 having, for example, the shape of a rake formed of gathering tubes connected to a discharge duct.

The injection tubes (or legs) 9 are regularly distributed inside the funnel 4 with a sufficient spacing to avoid that the catalyst particles become wedged or slowed down or braked between these legs.

These tubes 9 have different lengths and open at the base of the catalyst bed through orifices 11 regularly distributed and located at a small distance from the walls of the funnel as above mentioned.

FIG. 1 is a cross-sectional view of the reactor 1 and of the legs 9 opening at the vicinity of the funnel walls.

FIG. 1B shows an alternative embodiment of FIG. 1; the vertical legs 9 of FIG. 1 open under the grid 4 placed at the bottom of reactor 1.

Figure 1D:
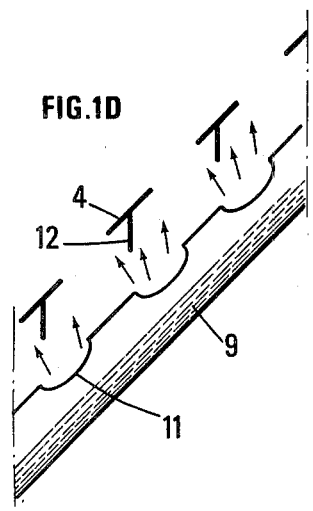

A preferred embodiment of FIG. 1B would consist, according to FIG. 1C, of introducing the liquid charge under grid 14 through at least one spray bar 8 feeding a plurality of injection tubes 9, provided with perforations such as 11 on the left hand side of FIG. 1C. The right hand side of FIG. 1C shows an embodiment wherein the grid 4 is provided with vertical gates defining open compartments as shown in FIG. 1D so as to prevent the gas from flowing toward the top of the distribution zone, thereby improving the gas-liquid distribution on the bed section. FIG. 1D shows the vertical gates 12 placed above a tube 9 provided with perforations 11. The number of gates 12 depends on the number of perforations 11.

FIGS. 2 and 2A diagrammatically show an embodiment wherein the catalyst is discharged through several withdrawal funnels. These figures 2 and 2A only show the bottom of reactor 1 and the funnels such as 4, and, in FIG. 2, the legs 9 and the spray bar 8. The cross-sectional view of FIG. 2A thus shows 4 funnels, two of which only are apparent on FIG. 2 in axial cross-section. When using several funnels, it is generally possible to arrange the injection tubes and/or the spray bars 8 as shown in FIGS. 1B, 1C and 1D.

The number of withdrawal funnels 4 depends on the geometry of the reactor, on the construction mechanical stresses, and on the desired uniformity of the paths for the catalyst particles passing through the various sections of the reactor.

Such a withdrawing mode makes easy the adjustment of the catalyst flow rate independently from that of the fluid charge and makes it possible to operate it at will with a continuous (moving bed), or discontinuous (fixed bed) catalyst withdrawal.

In FIGS. 1 and 2, the legs supplying the fluid charge are arranged vertically and are regularly distributed over the entire reactor section, up to the vicinity of the wall of the one or more catalyst withdrawal funnels.

When the fluid charge comprises several phases, the latter may be supplied either separately or in admixture in the desired proportions for a conversion in mixed gas-liquid phase.

In FIGS. 1 and 2 (and in a general manner) it is sometimes preferable, for example, to inject the gaseous phase, in major part, through said spray bar and said legs and to inject the liquid phase, in major part, under the walls of the one or more funnels, for example through duct 7 in FIG. 1.

The supply legs thus comprise, at their lower portion, means for injecting at least a portion of the fluid charge, provided with at least one of said orifices: these means may be of different types.

FIG. 3 shows a spray bar 8 and a leg 9 whose injection means consist of a perforated mouthpiece 11 arranged horizontally; the small arrows indicate the fluid path at the moment of its injection through said mouthpiece orifices.

There can also be used, in the reactor, both legs with mouthpieces oriented horizontally or vertically or arranged in any other direction.

According to another embodiment (FIG. 5), the fluid charge injection means may consist of small cylindrical nozzles 17 or perforated liners of a larger diameter than that of the feeding legs 9, these nozzles being arranged vertically and having horizontal slots for the injecting of the fluid charge.

These fluid charge admission means are all arranged at a small distance above the wall of the one or more withdrawal funnels, as above indicated.

The arrangement according to the invention makes it possible to ensure the homogeneous circulation of the catalyst bed and of the fluid charge in the reactor without braking of the catalyst flow by the distribution means or by the wall of the one or more withdrawal funnels.

Optionally it would be possible to effect a secondary fluid injection at the bottom of the one or more withdrawal funnels in order to prevent the packing of the catalyst at the lower part of the catalyst bed and to completely avoid any possibility of the catalyst coking.

The fluid used for this secondary injection may be hydrogen or a small fraction (of, for example, about 1%) of the converted charge issued from the upper part of the reactor, optionally, after cooling thereof.

FIG. 6 shows another device for injecting into the reactor 1 at least a portion of a fluid charge consisting of at least one liquid and/or gaseous phase. The charge is at least partly introduced through pipe 13 which penetrates substantially horizontally inside the reactor and then follows a path substantially in coincidence with the funnel axis (a single funnel 4 is shown in FIG. 6) up to the vicinity of the funnel bottom and of the catalyst withdrawal orifice 5, said pipe being subdivided into a bundle of branch tubes or lines 14 which raise along the walls of the funnel, substantially parallel to said walls, said tubes having, for example, orifices 15 for the charge injection. The device is thus formed of several tubes 14 which may, for example, be perforated as illustrated in FIG. 6 (preferably with downwardly oriented perforations) or still, for example, provided with circular or semi-circular downwardly oriented slots, as illustrated in FIG. 6A (tube 14 and orifice 15 in the form of slots).

FIG. 6B is a cross-sectional view of the device, from above, showing reactor 1 and branches such as 14, raising up and parallel to some generatrices of funnel 4 arranged like the ribs of an overturned umbrella. These tubes, which join together at the level of their lower part 16, are fed through pipe 13, which enters the reactor horizontally and then extends vertically at the center of the branch lines, generally co-axially with funnel 4 (or with each funnel when several funnels are involved).

Each of the injection tubes (14 tubes on FIGS. 6 and 6B) is close to the corresponding generatrix of the funnel cone, while, however, leaving a sufficient space between the cone and tube 14 to give free passage to the catalyst particles descending along the funnel.

The sections of the different injection tubes 14 are such that the eventual separation of the phases forming the fluid charge is made impossible by the turbulence phenomena.

The perforations or slots of these injection tubes, as above mentioned, are preferentially oriented downwardly so as to avoid their clogging with catalyst fragments and also in order to systematically irrigate the catalyst bed, particularly up to the vicinity of the funnel along which slides the catalyst.

What is claimed is:

1. In a process for introducing into a reaction zone, containing catalyst particles, a fluid charge consisting essentially of at least one liquid and one gas of high hydrogen content, said zone having substantially an elongate and substantially vertical cylindrical shape, with the catalyst particles being introduced at the upper part of said reaction zone and progressively withdrawn from the lower part of the reaction zone after progressing downwardly through said reaction zone, with the fluid charge being introduced at least partly in the lower part of said reaction zone and withdrawn from the upper part thereof after progressing upwardly through said reaction zone, and wherein the catalyst particles are withdrawn from the lower end of at least one flared zone having the shape of an inverted cone or pyramid with the top thereof turned downwardly, the average angle between the axis of the cone or pyramid and one of the cone generatrices or one of the pyramid solid angles being from 10°–80°, the downwardly turned top having at least one opening of a size sufficient for discharging the catalyst particles, and the walls of said flared zone being substantially and regularly discontinuous by having at least a plurality of regularly spaced openings of a sufficient small size to prevent the catalyst particles from passing through said walls, but sufficiently large enough to permit passage, through said openings, of an upward stream of at least a part of the fluid charge, the improvement wherein at least a portion of the fluid charge is injected in the lower part of said reaction zone through a main pipe which is subdivided into a plurality of pipes arranged substantially vertically inside the reaction zone, and each of said pipes having orifices at the ends thereof, said orifices being located either above said walls or below said walls of said cone, or one or more orifices located above and one or more orifices located below said walls, with each orifice being located at a distance from said walls of said cone at least equal to the average size of the catalyst particles fed into the reaction zone and at most equal to about 500 times the average size of said catalyst particles.

2. In a process for introducing into a reaction zone, containing catalyst particles, a fluid charge consisting essentially of at least one liquid and one gas of high hydrogen content, said zone having substantially an elongate and substantially vertical cylindrical shape, with the catalyst particles being introduced at the upper part of said reaction zone and progressively withdrawn from the lower part of the reaction zone after progressing downwardly through said reaction zone, with the fluid charge being introduced at least partly in the lower part of said reaction zone and withdrawn from the upper part thereof after progressing upwardly through said reaction zone, and wherein the catalyst particles are withdrawn from the lower end of at least one flared zone having the shape of an inverted cone or pyramid with the top thereof turned downwardly, the average angle between the axis of the cone or pyramid and one of the cone generatrices or one of the pyramid solid angles being from 10°–80°, the downwardly turned top having at least one opening of a size sufficient for discharging the catalyst particles, and the walls of said flared zone being substantially and regularly discontinuous by having at least a plurality of regularly spaced openings of a sufficiently small size to prevent the catalyst particles from passing through said walls, but sufficiently large to permit passage, through said openings, of an upward stream of at least a part of the fluid charge, the improvement wherein at least a portion of the fluid charge is injected in the lower part of said reaction zone through a main pipe which is subdivided into at least one tube respectively for said at least one flared zone, said at least one tube being substantially vertical along the axis of the cone or pyramid of said at least one flared zone and subdivided in the vicinity of the downwardly turned top of said cone or pyramid into a plurality of ducts substantially parallel to the generatrices of the cone or to the walls of the pyramid and located below said walls, and with orifices provided along said ducts beklow said walls of said cone or pyramid, and with each orifice being located at a distance from said walls of said cone or pyramid at least equal to the average size of the catalyst particles fed into the reaction zone and at most equal to about 500 times the average size of said catalyst particles.

3. A process in accordance with claim 1 or 2, wherein each of said orifices for injecting at least a portion of the fluid charge is located at a distance from said walls of the flared zone comprising 4–50 times the average size of the catalyst particles fed into the reaction zone.

4. A process according to claim 1 or 2, comprising injecting a fluid charge consisting a liquid and a gas, with the liquid being injected through said orifices, and the gas being injected independently at a location either above or below said walls of said cone or pyramid.

5. A process according to claim 1 or 2, comprising injecting a fluid charge consisting of a liquid and a gas, with the gas being injected through said orifices, and the liquid being injected at a location below said walls of said cone or pyramid.

6. In an apparatus for carrying out a process for withdrawing solid particles and introducing a liquid charge at the lowest portion of a contact zone, comprising a reactor (1), first introducing means (2) for introducing fresh catalyst at the upper part of the reactor, first discharge means for discharging used catalyst at the lower part of said reactor, with said first discharge means comprising at least one withdrawal funnel (4) of an inverted conical or pyramidal shape, with the angle between the axis of the cone or of the pyramid with one of the generatrices of the cone or one of the solid angles of the pyramid being 10°–80° and with the top of the cone or pyramid oriented downwardly, at least one opening (5) sufficiently large for permitting discharge of used catalyst from the reactor, and located at said downwardly oriented top, second introducing means (8) for introducing a fluid charge at the lower part of the reactor and second discharge means (10) for discharging a treated fluid charge from the upper part of the reactor, the walls of said withdrawing funnel (4) having perforations (6) substantially distributed over the surface of said funnel, with the size of said perforations being sufficiently small to prevent the passage of catalyst particles through said walls, but sufficiently large to provide for passage through said walls of an upward stream of at least a portion of a fluid charge introduced into the apparatus, the improvement wherein said second introducing means (8) for introducing the fluid charge comprises a plurality of substantially vertical ducts (9) provided with orifices (11) for introducing at least a portion of the fluid charge, said orifices being located either above or below, or both above and below said walls of said cone or pyramid, and at a distance from said walls of said cone or pyramid at least equal to the average size of catalyst particles to be introduced and at most equal to about 10 cm.

7. An apparatus according to claim 6, wherein the orifices for injecting at least a portion of the fluid charge are located above the walls of the at least one withdrawal funnel.

8. An apparatus according to claim 6, wherein the orifices for injecting at least a portion of the fluid charge are located below the walls of the at least one withdrawal funnel.

9. An apparatus according to claim 7 or 8, wherein the orifices are located in vicinity of the lower end of said plurality of substantially vertical ducts (9), with the spacing between the ducts being sufficient to avoid stoppage of downwardly progressing of any introduced catalyst particles, and with the plurality of ducts being fed by at least one pipe (8) which penetrates substantially horizontally into the interior of the reactor.

10. An apparatus according to claim 7 or 8, wherein said ducts for introducing the fluid charge further comprise at their lower part a perforated mouthpiece which defines said orifices.

11. An apparatus according to claim 10, wherein said mouthpiece is substantially vertically disposed.

12. An apparatus according to claim 10, wherein said mouthpiece is substantially horizontally disposed.

13. An apparatus according to claim 10, wherein said ducts for introducing the fluid charge include in the vicinity of their lower end members of a large diameter than the ducts which are perforated liners, said members being arranged vertically and having horizontal slots for injecting a fluid charge therethrough.

14. In an apparatus for carrying out a process for withdrawing solid particles and introducing a liquid charge at the lower portion of a contact zone, comprising a reactor (1), first introducing means (2) for introducing fresh catalyst at the upper part of the reactor, first discharge means for discharging used catalyst at the lower part of said reactor, with said first discharge means comprising at least one withdrawal funnel (4) of an inverted conical or pyramidal shape, with the angle between the axis of the cone or of the pyramid with one of the generatrices of the cone or one of the solid angles of the pyramid being 10°–80° and with the top of the cone or pyramid oriented downwardly, at least one opening (5) sufficiently large for permitting discharge of used catalyst from the reactor, and located at said top, second introducing means (8) for introducing a fluid charge at the lower part of the reactor and second discharge means (10) for discharging a treated fluid charge from the upper part of the reactor, the walls of said withdrawing funnel (4) having perforations (6) substantially distributed over the surface of said funnel, with the size of said perforations being sufficiently small to prevent the passage of catalyst particles through said walls, but sufficiently large to provide for passage through said walls of an upward stream of at least a portion of a fluid charge introduced into the apparatus, the improvement wherein said second introducing means (8) for introducing the fluid charge comprises a bundle of ascending branch pipe (9) substantially parallel to the walls of the funnel and located below said walls, said pipes (9) having openings for injecting at least a portion of the charge therethrough, and said openings being located below said walls and at a distance from said walls at least equal to the average size of catalyst particles to be introduced into the apparatus and at most equal to about 10 cm.

15. An apparatus according to claim 14 wherein said openings are perforations or slots, with said perforations or slots oriented upwardly.

16. An apparatus according to claim 15 wherein said walls (4) further comprise vertical gates (12) located substantially above the openings or perforations (11) of said tubes or pipes (9), and with the number of said gates (12) determined in accordance with the number of openings or perforations (11).

* * * * *